Figure 1:
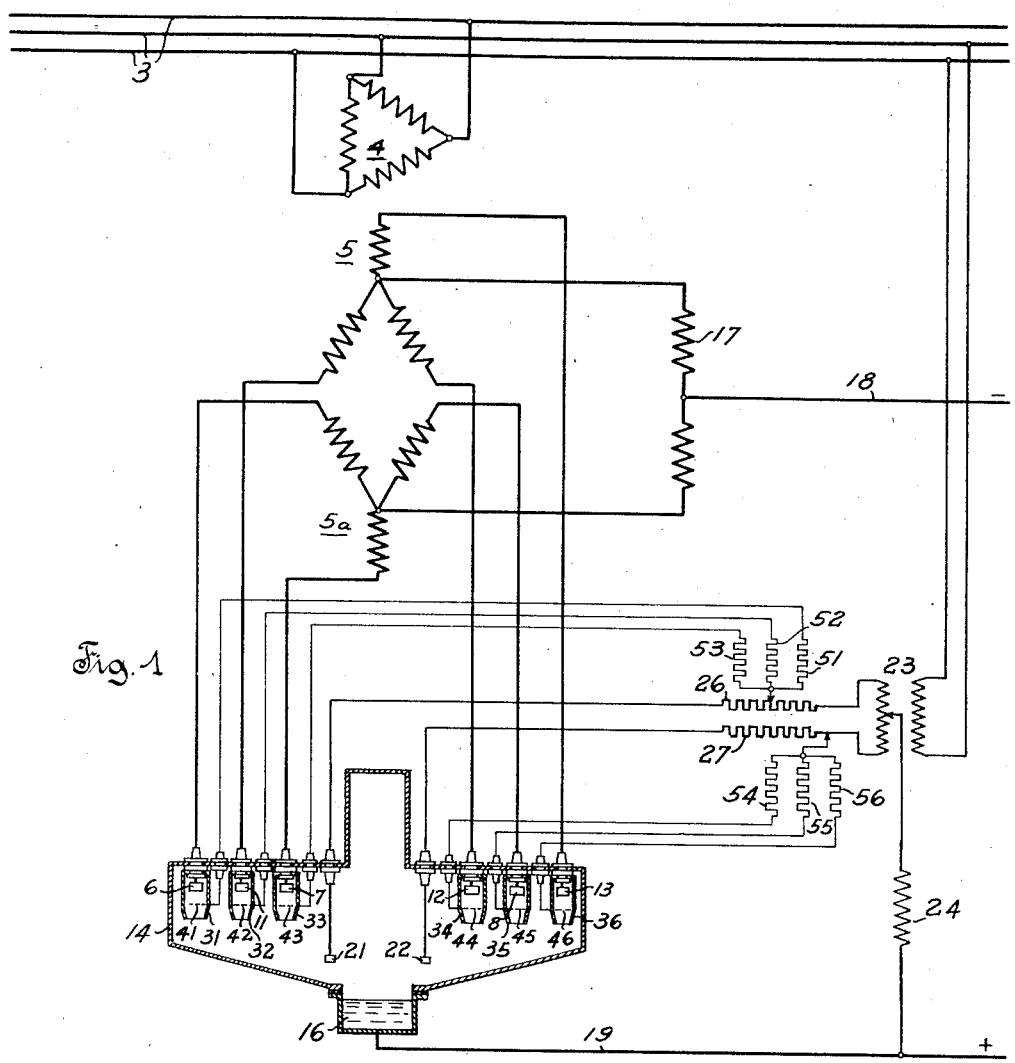

July 18, 1933.  H. KELLER  1,918,757
ELECTRIC CURRENT RECTIFIER CONTROL SYSTEM
Filed Jan. 2, 1932

Inventor
H. Keller
by G. J. Delvi
Attorney

Patented July 18, 1933

1,918,757

UNITED STATES PATENT OFFICE

HANS KELLER, OF BADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

ELECTRIC CURRENT RECTIFIER-CONTROL SYSTEM

Application filed January 2, 1932, Serial No. 584,407, and in Germany December 22, 1930.

This invention relates to improvements in electric current rectifying systems employing an electric current rectifier of the metallic vapor arcing type and more particularly to a rectifying system in which means are provided to control the picking up of the arc by the anodes of the rectifier.

When the anodes of electric current rectifiers of the metallic vapor arcing type are provided with arc guides and/or grids arranged between the anodes and the cathode, it is often very difficult or even impossible for the anodes to pick up the arc. When the rectifier load drops to a very low value, the main anodes become unequally loaded and the arc may be entirely interrupted. It is well known that picking up of the arc by the anodes is facilitated by impressing a potential on the grids or on the grids and the arc guides which potential is more positive relative to the cathode than the adjacent main anode at that moment. Such potential must usually be supplied from a source of either alternating or direct current other than the source of alternating current supply to the rectifier or the direct current produced by the rectifier. The source of current supplied to the grids being different from either the alternating current supply or the direct current produced, the conductors of the grids must be specially insulated from the rectifier structure and a separate transformer or a separate source of direct current must be provided for supplying the grids.

All of the above disadvantages in an electric current rectifying system may be avoided if the grids are connected through resistances with the same source of current that supplies the main and excitation anodes of the rectifier. Each excitation anode, when only two excitation anodes are provided for a polyphase rectifier, is positive during a period of time which is from 120 to 180 electrical degrees of the period of positive voltage supply to each of the main anodes. If the grids are connected through resistances with the source of current supplying the excitation anodes with positive potential at the time the main anodes controlled by such grids are to pick up the arc, the grids will have a positive charge and the picking up of the arc will be facilitated.

It is, therefore, among the objects of the present invention to provide an electric current rectifying system in which a common source of potential is used to supply the excitation anodes and the grids of an electric current rectifier of the metallic vapor arcing type.

Another object of the invention is to provide an electric current rectifying system in which the excitation anodes and the grids of an electric current rectifier of the metallic vapor arcing type are supplied with potential from the source of current supplying the main anodes of the rectifier.

Another object of the invention is to provide an electric current rectifying system in which a transformer for supplying operating potential to both the excitation anodes and the grids of an electric current rectifier of the metallic vapor arcing type is supplied from the same source of current that supplies the transformer supplying the main anodes of the rectifier.

Figure 2:
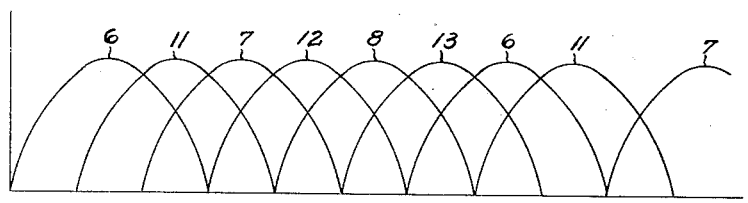
Figure 3:
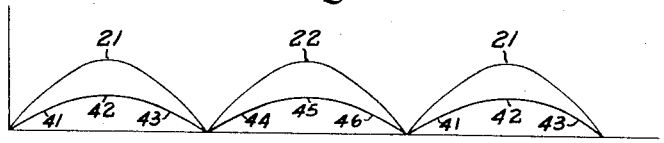

Objects and advantages, other than those above set forth, will be apparent from the following description when read in connection with the accompanying drawing in which:

Fig. 1 diagrammatically illustrates one embodiment of the invention in which a six phase rectifier of the metallic vapor arcing type is provided with two excitation anodes and in which grids arranged adjacent the main anodes of the rectifier are supplied with potential from a transformer supplying potential to the excitation anodes, and Fig. 2 diagrammatically illustrates the potential relations of the main anodes relative to the potential of the neutral point of the usual interphase transformer, and Fig. 3 diagrammatically illustrates the potential relations of the excitation anodes and the grids relative to the potential of the cathode.

Referring more particularly to the drawing by characters of reference, the reference numeral 3 designates an alternating current supply line to which is connected a transformer having a primary winding 4 and secondary windings 5 and 5a each of which secondary windings are formed to provide a neutral point. The terminals of the several coils forming each of the secondary windings are each connected with one of a plurality of main anodes 6, 7 and 8 and 11, 12 and 13 respectively. The anodes are enclosed within a tank 14 which is adapted to be evacuated and which is provided in the bottom thereof with a pool of vaporizable material 16, such as mercury, forming a cathode.

The neutral points of the secondary windings of the transformer supplying the main anodes with alternating current from the supply line 3 are interconnected by an interphase transformer 17 having the mid point thereof connected with a conductor 18 constituting the negative bus bar of a direct current circuit (only partially shown). A conductor 19 connected with the cathode 16 of the rectifier constitutes the positive bus bar of the direct current circuit.

A pair of excitation anodes 21 and 22 are arranged within the tank 14 and extend into a zone of greater vapor density than the main anodes for the purpose of maintaining an arc within the tank. The excitation anodes thus keep the rectifier in the excited condition, i. e., maintain the arc therein, particularly during periods when the arc is about to die out at one of the main anodes and is to be picked up by another of the main anodes. The excitation anodes are supplied with current from a transformer 23 connected with the alternating current supply line 3, the secondary winding of the transformer 23 being connected at its mid point with the positive direct current bus bar 19 through a reactance 24 and being connected with the excitation anodes 21 and 22 through resistances 26 and 27.

Each of the main anodes 6 to 16 inclusive are preferably partially enclosed by arc guides 31 to 36 inclusive within with are arranged grids or control electrodes 41 to 46 inclusive which may be conductively connected with the arc guides or may be insulated therefrom. A potential is to be impressed on each of the grids to aid the associated main anode to pick up the arc or to prevent such picking up of the arc when the associated main anode is at a potential negative with respect to the cathode. The control electrodes are preferably adjustably connected through resistances 51 to 56 inclusive with the resistances 26 or 27 in the supply connection of the excitation anodes 21 and 22 with the excitation transformer 23. The potential supplied to the excitation anodes is of the same polarity as the polarity of the potential supplied to the main anodes through the transformer 4, 5, 5a and the potential of the grids is likewise of the same polarity as the polarity of the potential of the excitation anodes but of higher potential than the potential of the excitation anodes. If the resistances 51 to 56 inclusive are arranged within the rectifier tank and the connection thereof with the excitation anode circuits is external of the tank, only two bushings are required to insulate all of the grids from the tank and if the resistances 51 to 56 inclusive are connected with the excitation anodes within the tank, the necessity for insulating bushings for the conductors leading to the grids is obviated. If a three phase transformer is used for the excitation anodes the grids for a rectifier such as shown will of course be divided into three groups, each group being connected with one of the phases of such transformer.

The potential relations of the grids, of the excitation anodes, and of the main anodes are indicated by the curves shown in Fig. 2 and Fig. 3 in which the curves are designated by the reference numerals designating the grids, the excitation anodes and the main anodes in Fig. 1. The curves showing the main anode potentials are taken with the mid point potential of the interphase transformer as the base line and the grids and excitation anode potentials are shown relative to a line indicating the cathode potential. Thus excitation anode 21 has positive potential impressed thereon when positive potential is impressed on main anodes 6, 11 and 16 and excitation anode 22 has positive potential impressed thereon when positive potential is impressed on main anodes 7, 12 and 8. Control electrodes 41, 42 and 43 are thus positive when excitation anode 21 is positive and control electrodes 44, 45 and 46 are positive when excitation anode 22 is positive. It will be seen from Fig. 3 that the potential impressed upon the grids is lower than the potential impressed upon the excitation anodes which results from the differences in the values of the resistance in circuit with the excitation anodes and the resistances in the grid circuits.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In an electric current rectifying system, an alternating current supply line, an electric current rectifier of the metallic vapor arcing type having main anodes, grids arranged adjacent the main anodes, excitation anodes and a cathode, a transformer connecting the main anodes with said supply line, a second transformer connecting the said supply line with the said excitation anodes and with said grids, resistances in the connections of the said second transformer with the said excitation anodes and with said grids, and other resistances in the connections of the said grids with the first said resistances.

2. In an electric current rectifying system, an alternating current supply line, an electric current rectifier of the metallic vapor arcing type having main anodes, grids arranged adjacent the main anodes, excitation anodes and a cathode, a transformer connecting the said supply line with the main anodes, a second transformer having a primary winding connected with said supply line and a secondary winding connected with the said excitation anodes and said grids and with said cathode, a reactance in the connection of said secondary winding with the said cathode, resistances in the connection of said excitation anodes with the second said transformer, and other resistances in the connection of said grids with the second said transformer, the connections of the grids with the secondary winding of the second said transformer also including the first said resistances.

3. In an electric current rectifying system, an alternating current supply line, an electric current rectifier of the metallic vapor arcing type having main anodes with associated control electrodes and having excitation anodes and a cathode, a transformer connecting the main anodes with said supply line, a second transformer connecting the said supply line with the excitation anodes and with the control electrodes, impedances connecting the excitation anodes and the control electrodes with the second said transformer, and an impedance connecting the cathode with the second said transformer.

4. In an electric current rectifying system, an alternating current supply line, an electric current rectifier of the metallic vapor arcing type having main anodes with associated control electrodes and having excitation anodes and a cathode, a transformer connecting the main anodes with said supply line, a second transformer connecting the said supply line with the excitation anodes and with the control electrodes, current maintaining means connecting the cathode with the second said transformer, current limiting means connecting the excitation anodes with the second said transformer, and current limiting means connecting the control electrodes with the first said current limiting means.

5. In an electric current rectifying system, a polyphase alternating current supply line, a polyphase electric current rectifier of the metallic vapor arcing type having main anodes with associated control electrodes and having excitation anodes and a cathode, a polyphase transformer connecting the main anodes with said supply line, a single phase transformer connecting said supply line with the excitation anodes and with the control electrodes, impedances connecting the excitation anodes and the control electrodes with the second said transformer, and an impedance connecting the cathode with the second said transformer.

6. In an electric current rectifying system, a polyphase alternating current supply line, a polyphase electric current rectifier of the metallic vapor arcing type having main anodes with control electrodes severally associated therewith and having excitation anodes and a cathode, a polyphase transformer connected with said supply line and having the anodes of said rectifier severally connected with the phases of said transformer, a second transformer connecting said supply line with the excitation anodes and with the control electrodes, a plurality of the control electrodes being connected with the same phase of the second said transformer, impedances connecting the excitation anodes and the control electrodes with the second said transformer, and an impedance connecting the cathode with the second said transformer.

7. In an electric current rectifying system, a polyphase alternating current supply line, a polyphase electric current rectifier of the metallic vapor arcing type having anodes with control electrodes severally associated therewith and having excitation anodes and a cathode, a polyphase transformer connected with said supply line and having the anodes of said rectifier severally connected with the phases thereof, a single phase transformer connecting said supply line with the excitation anodes and with the control electrodes, a plurality of the control electrodes and one of the excitation anodes being connected with each phase of the said single phase transformer, impedances connecting the control electrodes with the said single phase transformer, and an impedance connecting the cathode with the said single phase transformer.

HANS KELLER.